United States Patent [19]
Thompson et al.

[11] Patent Number: 5,838,751
[45] Date of Patent: Nov. 17, 1998

[54] CORE PLATE REPAIR USING GUIDE TUBE GAP WEDGES

[75] Inventors: Jeffrey Lee Thompson; Douglas Kevin Ethridge, both of San Jose; John Geddes Erbes, Mt. View, all of Calif.; Martin Daniel Kaylor, Dayton, Ohio

[73] Assignee: General Electric Company, Schenectady, N.Y.

[21] Appl. No.: 796,093

[22] Filed: Feb. 5, 1997

Related U.S. Application Data

[63] Continuation-in-part of Ser. No. 664,605, Jun. 18, 1996, Pat. No. 5,646,970.
[51] Int. Cl.$^6$ .................................................... G21C 19/00
[52] U.S. Cl. ......................... 376/260; 376/353; 376/347; 376/285
[58] Field of Search .................................... 376/260, 277, 376/285, 347, 353, 362

[56] References Cited

U.S. PATENT DOCUMENTS

| | | | |
|---|---|---|---|
| 4,904,443 | 2/1990 | Carruth | 376/353 |
| 5,502,754 | 3/1996 | Erbes | 376/285 |
| 5,646,970 | 7/1997 | Thompson | 376/260 |

*Primary Examiner*—Daniel D. Wasil

[57] ABSTRACT

A method and an apparatus for repairing a core plate having a cracked support structure. The method entails the step of providing a vertical compression load path between the core plate and one or more control rod guide tubes. This is accomplished by installing a plurality of load-bearing wedges between the core plate and the step of each guide tube. Each load-bearing wedge is placed between the core plate and the guide tube machined step so that core plate pressure loads are reacted by the weight of the fuel rather than the core plate support structure. The load-bearing wedges can be installed without removing the guide tube or the fuel support casting.

15 Claims, 11 Drawing Sheets

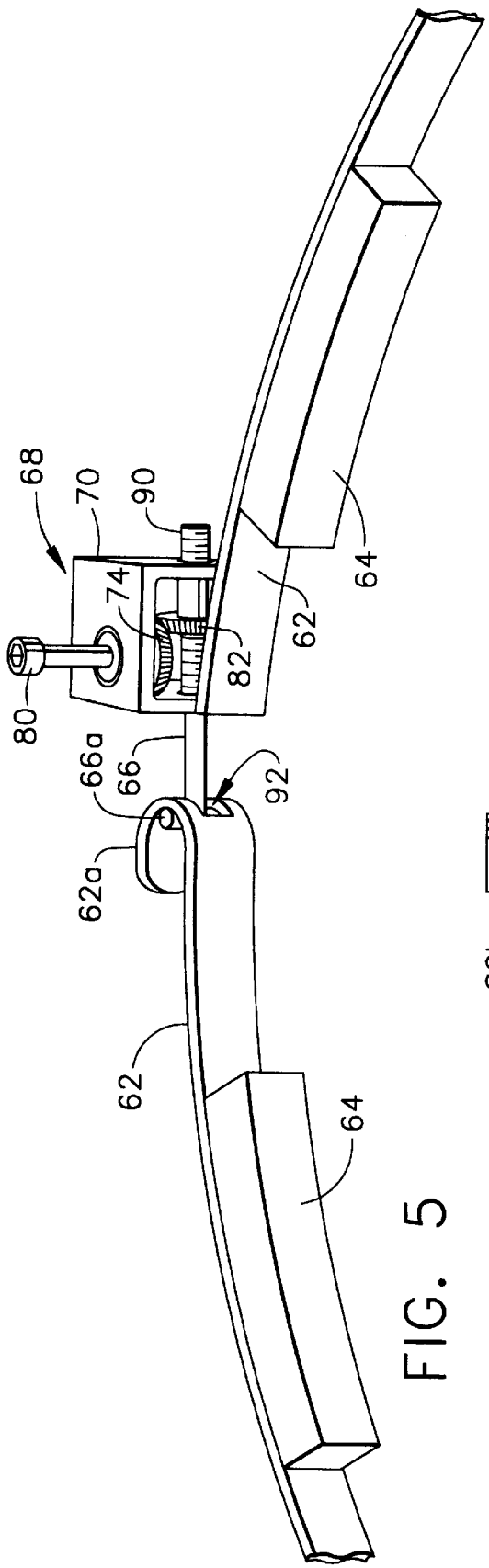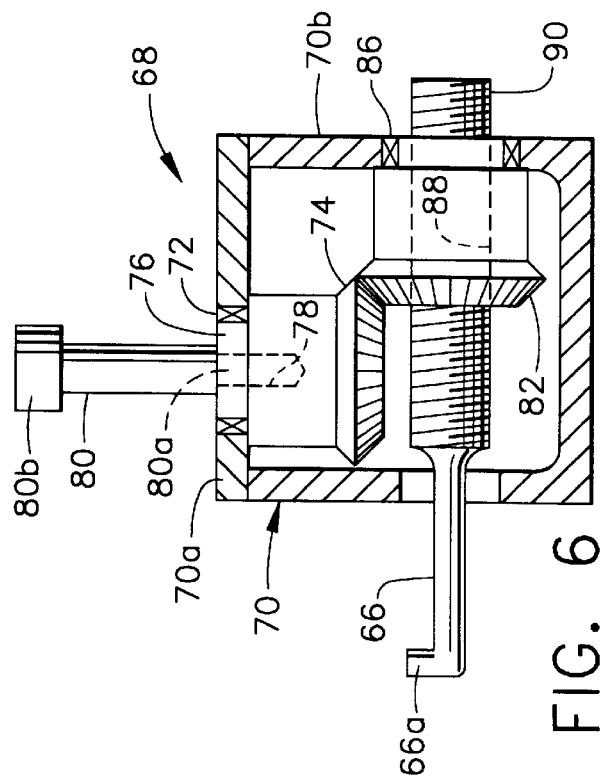

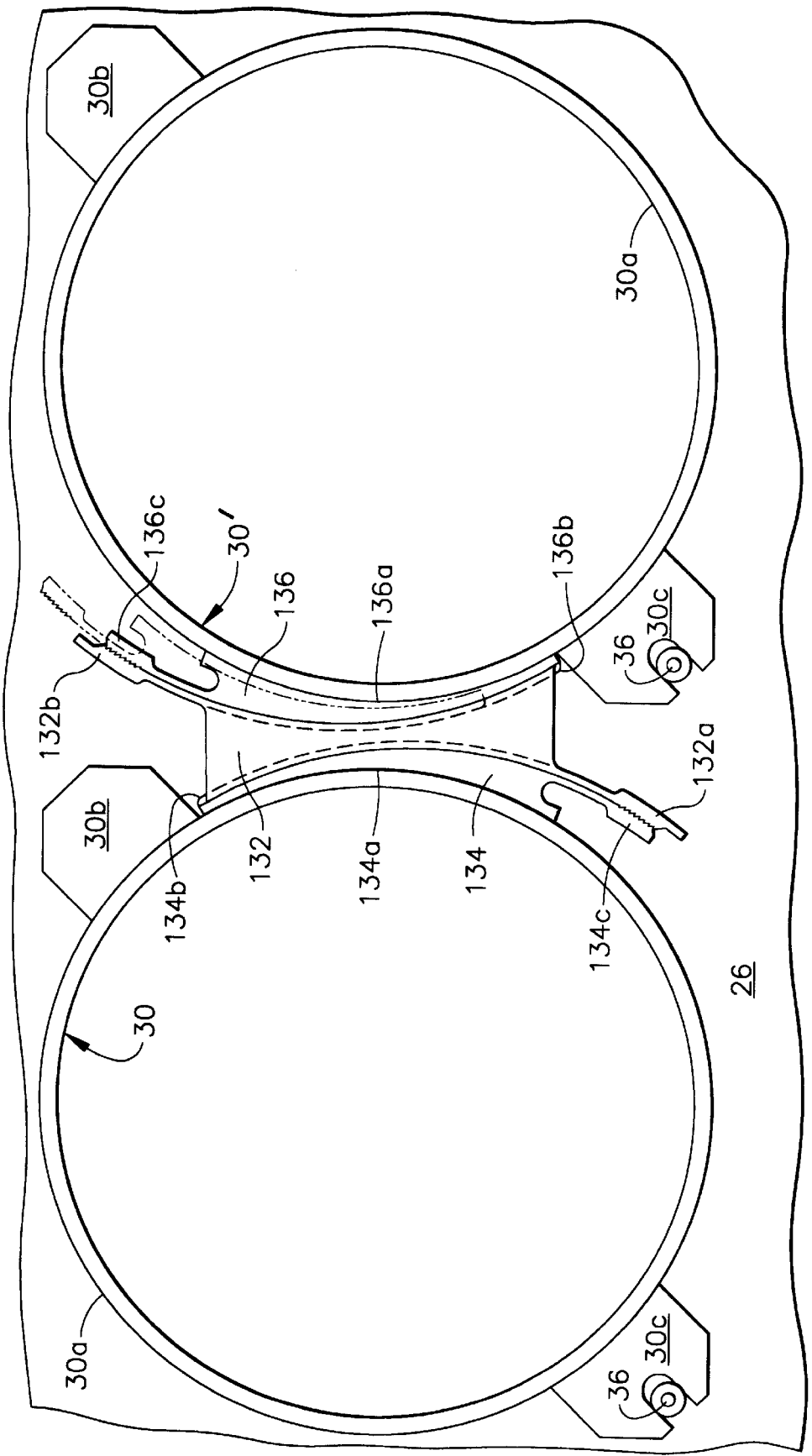

CORE PLATE REPAIR USING GUIDE TUBE GAP WEDGES

RELATED PATENT APPLICATION

This application is a continuation-in-part application of U.S. patent application Ser. No. 08/664,605 filed on Jun. 18, 1996, now U.S. Pat. No. 5,646,970.

FIELD OF THE INVENTION

This invention generally relates to techniques for the repair of cracked components of light water nuclear reactors. In particular, the invention relates to remotely installed hardware for restraining upward deflection of a core plate having a cracked support structure.

BACKGROUND OF THE INVENTION

As seen in FIG. 1, a conventional boiling water reactor has a reactor pressure vessel 10 and a core shroud 12 arranged concentrically in the reactor pressure vessel with an annular region, namely, the downcomer annulus 14, therebetween. The core shroud 12 is a stainless steel cylinder surrounding the nuclear fuel core. In particular, the core shroud 12 comprises a shroud head flange 12a for supporting the shroud head (not shown); a circular cylindrical upper shroud wall 12b having a top end welded to shroud head flange 12a; an annular top guide support ring 12c welded to the bottom end of upper shroud wall 12b; a circular cylindrical middle shroud wall welded assembly 12d welded to the top guide support ring 12c; and an annular core plate support ring 12e welded to the bottom of the middle shroud wall 12d and to the top of a lower shroud wall 12f. As seen in FIG. 1, the shroud 12 is vertically supported by a plurality of shroud support legs 16, each of the latter being welded to the bottom head of the reactor pressure vessel 10. The shroud is laterally supported by an annular shroud support plate 18, which is welded at its inner diameter to the shroud 12 and at its outer diameter to the reactor pressure vessel 10. The shroud support plate 18 has a plurality of circular apertures 20 in flow communication with the diffusers of a plurality of jet pump assemblies (not shown), The fuel core of a BWR consists of a multiplicity of upright and parallel fuel bundle assemblies 22 arranged in 2×2 arrays, each assembly consisting of an array of fuel rods inside a fuel channel made of zirconium-based alloy. Each array of fuel bundle assemblies is supported at the top by a top guide 24 and at the bottom by a core plate 26. The core top guide 24 provides lateral support for the top of the fuel assemblies; the core plate 26 provides lateral support for the bottom of the fuel assemblies. This lateral support maintains the correct fuel channel spacing in each 2×2 array to permit vertical travel of a cruciform control rod blade 28 in between the fuel channels.

The power level of the reactor is maintained or adjusted by positioning the control rods 28 up and down within the core while the fuel bundle assemblies 22 are held stationary. Each control rod 28 has a cruciform cross section consisting of four wings at right angles. Each wing consists of a multiplicity of parallel tubes welded in a row, each tube containing stacked capsules filled with neutron-absorbing material. Each control rod is raised or lowered inside a control rod guide tube 30 by an associated control rod drive (not shown) which is releasably coupled by a spud at its top to a socket in the bottom of the control rod.

Control rod drives are used to position control rods in BWRs to control the fission rate and fission density, and to provide adequate excess negative reactivity to shutdown the reactor from any normal operating or accident condition at the most reactive time in core life. Each control rod drive is mounted vertically in a control rod drive housing 32 which is welded to a stub tube 34, which in turn is welded to the bottom head of the reactor pressure vessel 10. The control rod drive is a double-acting, mechanically latched hydraulic cylinder. The control rod drive is capable of inserting or withdrawing a control rod (not shown) at a slow controlled rate for normal reactor operation and of providing rapid control rod insertion (scram) in the event of an emergency requiring rapid shutdown of the reactor.

The control rod drive housing 32 has an upper flange that bolts to a lower flange of the guide tube 30. Each guide tube 30 sits on top of and is vertically supported by its associated control rod drive housing 32. The uppermost portion of the guide tube penetrates a corresponding circular aperture in the core plate 26. There are typically 140 guide tubes penetrating an equal number of circular apertures in the core plate, each aperture having a diameter slightly greater than the outer diameter of the guide tube.

The control rod drive housings and guide tubes have two functions: (1) to house the control rod drive mechanisms and the control rods, respectively, and (2) to support the weight of the fuel. The fuel weight is reacted at the orifice fuel support casting 38 which sits in the top of the guide tube 30. The control rod drive guide tubes and housings act as columns carrying the weight of the fuel.

The top guide 24 provides lateral support to the upper end of the fuel bundle assemblies 22, neutron monitoring instrument assemblies (not shown) and installed neutron sources (not shown), and maintains the correct fuel channel spacing to permit control rod insertion. The top guide 24 is designed so that during periodic refueling operations, the fuel bundle assemblies 22 can be lifted out of and lowered into the core without removing the top guide. One type of top guide installed in certain types of BWRs has a fabricated design comprising a lattice of interlocking upper and lower beams held together by a large circular ring. The circular ring of the top guide sits on the top guide support ring 12c of the shroud 12, and is provided with radially inwardly directed flanges that capture the distal ends of the beams.

The core plate 26 is bolted to and supported by the core plate support ring 12e. The core plate of a BWR has two functions: (1) to act as a flow barrier directing the flow of coolant water through the fuel channels containing the fuel rods to maximize heat transfer; and (2) to provide lateral restraint for the fuel channels by restraining horizontal movement of the control rod guide tubes 30. The pressure across the core plate 26 results in an upward load that is carried by the core plate and its underlying support structure 40.

During operation of the reactor, water is continuously recirculated down the downcomer annulus 14, into the lower plenum 42 and then up through the core. This flow is induced by a multiplicity of jet pumps (not shown) located in the downcomer annulus and driven by recirculation pumps (not shown) outside the reactor pressure vessel 10. The water in the lower plenum 42 enters the core via a plurality of flow inlets 44 in the guide tube. Each guide tube has four flow inlets 44.

Referring to FIGS. 2 and 3, a fuel support casting 38 sits on top of the guide tube 30 and has a 2×2 square array of openings 102 (only one of which is shown in FIG. 3). The upper end of each opening 102 is formed with a chamfered seat 38a. Each chamfered seat supports a respective fuel bundle assembly. The fuel support casting also has a cruciform opening for passage of the control rod blade between the fuel bundle assemblies of a 2×2 array. Each flow inlet 44 (see FIG. 2) is in flow communication with a corresponding opening 102 in the fuel support casting 38.

The bottom piece 104 of each fuel bundle assembly is configured with a portion 104*a* that enters the corresponding opening 102, a portion having a conical surface 104*b* which bears against the chamfered seat 38*a*, a portion 104*c* around which the fuel channel 106 is fitted, and an apertured portion 104*d* having an array (e.g., 8×8 or 9×9) of apertures 108. Each aperture 108 receives the tip of a bottom end plug 110 of a respective one of the fuel rods 112 making up the fuel bundle assembly.

As seen in FIG. 3, the fuel support casting 38 further comprises a portion having a conical surface 38*b* which bears against a chamfered seat 30*d* formed at the top edge of the guide tube 30. The guide tube also has a machined step 30*a* which extends radially outward a distance equal to about 30 mils. The height of the gap between the core plate and the step 30*a* is about ½ inch.

As best seen in FIG. 4, a pair of lugs 30*b* and 30*c* are welded to the machined step at diametrally opposite positions. These lugs extend radially outward in opposite directions. Each of lugs 30*b* and 30*c* has a height less than the height of step 30*a* (see FIG. 3). The guide tube lug 30*b* has a slot 46 (seen in both FIGS. 3 and 4) of width slightly greater than the diameter of a vertical alignment pin 36 mounted on the core plate 26. During installation, the guide tube 30 must be rotated until the lug slot lines up with the alignment pin 36. Referring to FIG. 3, the lower edge of slot 46 has a chamfer 46*a* and the tip 36*a* of pin 36 is conical to facilitate entry of the pin into the slot as the guide tube is lowered. Similarly, the fuel support casting 38 has a slot 38*c* which aligns with pin 36.

After the fuel support casting 38 is in place, four fuel bundle assemblies 22 are lowered through a square opening in the top guide and onto respective chamfered seats 38 of the fuel support casting 38. During reactor operation, water flows radially inward through the four flow inlets 44, upwardly through the openings 102 in the fuel support casting and then upwardly through the fuel channels 106. The water flowing between the fuel rods acts as both a coolant for removing heat and a moderator for stopping neutrons.

The structural stability of the fuel core is critical to safe operation of the reactor. The structural components which support the fuel core must be inspected regularly and any defective or damaged components uncovered by the inspection must be replaced or repaired. Stress corrosion cracking (SCC) is a known phenomenon occurring in reactor components, such as the core plate support structure, which are exposed to the high-temperature water environment inside a BWR. As used herein, SCC refers to cracking propagated by static or dynamic tensile stressing in combination with corrosion at the crack tip. The reactor components are subject to a variety of stresses associated with, e.g., differences in thermal expansion, the operating pressure needed for the containment of the reactor cooling water, and other sources such as residual stress from welding or cold working. In addition, water chemistry, welding, heat treatment, and radiation can increase the susceptibility of metal in a component to SCC.

Postulated cracking of the core plate support structure could result in loss of core plate support, resulting in uncontrolled loads on the control rod drive housings. Loss of core plate support would result in upward movement of the core plate caused by pressure under the plate. Thus, there is a need for a remotely installable means for repairing damaged core plates.

SUMMARY OF THE INVENTION

The present invention is a method and an apparatus for repairing a core plate having a cracked support structure. The method entails the step of providing a vertical compression load path between the core plate and one or more control rod guide tubes. This is accomplished by installing a plurality of load-bearing wedge elements between the core plate and the steps of the guide tubes. Each load-bearing wedge element is placed between the core plate and a machined step on the guide tube so that core plate pressure loads are reacted by the weight of the fuel rather than the core plate support structure.

The installation of a solid ring would require removal of the guide tube and fuel support casting. In contrast, the load-bearing wedge elements of the present invention can be installed without removing the guide tube or the fuel support casting. The limited space between the guide tubes, which are under water and surrounded by active fuel channels, requires that the wedge devices conform to restrictive geometry and be remotely installable. The designs must also provide a compression load path between the guide tube and core plate.

In accordance with one preferred embodiment of the invention, coupled compression wedges are interposed between the core plate and the machined steps of two adjacent guide tubes. The two compression wedges are held together with a bracket in a configuration narrow enough to fit between the guide tubes. The compression wedges are positioned laterally using a threaded coupling to press an expansion wedge in a downward direction. The downward movement of the expansion wedge imparts lateral movement to the compression wedges, thereby interposing each compression wedge between the core plate and a corresponding machined step of the adjacent guide tubes, and holds the interposed compression wedges in position. Up to four pairs of compression wedges can be installed at respective 90° azimuthal intervals around the guide tube periphery. Each pair comprises a first compression wedge coupled via an expansion wedge to a second compression wedge that bears against a one of the four adjacent guide tubes. However, vertical restraint of the core plate can be achieved by installing fewer than four wedges for each guide tube. Nor is it necessary to install wedges under the machined step of every guide tube.

In accordance with a further feature of the first embodiment, each compression wedge has a vertical expansion wedge slidably mounted thereon. The vertical expansion wedge is arranged so that the total height of the compression wedge/vertical expansion wedge assembly increases as the compression wedge is moved toward contact with the guide tube. In particular, the vertical expansion wedge is elevated so that its upper edge contacts and is urged against the underside of the machined step at the top of the guide tube.

In accordance with another preferred embodiment of the invention, the repair method involves the step of interposing a plurality of belt-mounted wedges between the core plate and the machined step of a guide tube. The plurality of wedges are held in place by a flexible tensioning belt, e.g., a thin band of metal alloy. The wedges are attached to the tensioning belt at spaced intervals. The belt has open and closed configurations. In the open configuration, the belt can be lowered between adjacent fuel support castings and laid onto the core plate. The belt is then placed around a guide tube by threading the belt through the space bounded by the core plate, the guide tube, the associated fuel support alignment pin and the slotted lug on the guide tube which engages that alignment pin. One end of the belt has a hook or other means that engages a capture device to latch the belt in the closed configuration. After the belt has been closed, the belt is tensioned with a bevel gear and threaded block arrangement.

In accordance with the second preferred embodiment, the wedges attached along the length of the belt are designed to grip the perimeter of the guide tube more tightly as the compression loads exerted by the core plate increase. The gripping action is achieved by the eccentricity of the compression load. The eccentricity creating the gripping action is caused by the radius of the core plate hole, which moves the center of action of the core plate reaction load radially outward from the guide tube reaction load center of action, thereby tending to rotate the wedge into the guide tube as compression loads increase. The belt and core plate react the wedge kickout load at the interface between the core plate and wedge.

In accordance with a further aspect of the second embodiment, a plurality of pairs of wedges are pivotably mounted on respective pivot pins which are attached to the tensioning belt at spaced azimuthal positions therealong. Prior to belt tensioning, the pivotable wedges of each pair are oriented at a predetermined angle greater than 90° but less than 180° relative to each other. When the belt is tensioned, the tips of the pivotable wedges contact the guide tube and are rotated in opposite directions with increasing belt tension, during which the pivot pins move closer to the guide tube. The pivotable wedges have lengths such that when the wedges reach a relative angular position of about 180°, the tip of each upper pivotable wedge will be pressed up underneath the machined step of the guide tube. Each pair of diametrally opposed pivotable wedges acts as a rigid wedge block that restrains upward vertical displacement of the core plate relative to the guide tube.

In accordance with a third preferred embodiment, a pair of curved compression wedges are slidably mounted on curved tracks (or in curved grooves) on a central expansion wedge. Each curved compression wedge has an inner radius generally equal to the radius of the guide tube, against which the fully loaded compression wedge bears, and an outer radius equal to the radius of the opposing surface on the expansion wedge. The inner and outer radial surfaces of each compression wedge are not concentric, but rather are arranged so that the distance separating the two curves (measured, e.g., along a line perpendicular to the inner radius) decreases monotonically as the inner radial surface is traversed in a direction from the wide end to the narrow end of the compression wedge. This allows the assembly to function as an expanding wedge, filling the space between adjacent guide tubes from the core plate to the machined step on the guide tubes. The expansion occurs because the total radial thickness of the assembly increases as the compression wedges are slid azimuthally from their extended to retracted positions. The expansion allows the assembly to fit in place past the narrower space above the guide tube step, then expand to fit against the wider space below the step.

The wedge assembly in accordance with the third embodiment is lowered into position with the compression wedges in respective extended positions that allow the entire assembly to fit in between a pair of adjacent guide tubes. When the assembly is seated on the core plate, a remotely operated tool is then used to move the compression wedges into their retracted positions by sliding displacement along the central expansion wedge, until the inner radial surfaces of the compression wedges are flush against the opposing surfaces of the adjacent guide tubes. Each compression wedge is locked in the retracted position by means of a respective integral spring arm having ratchet teeth which engage the ratchet teeth on a respective mating spring arm integrally formed on the expansion wedge.

In accordance with the invention, each compression load-bearing wedge is installed at an elevation between the guide tube machined step and the core plate without removal of the guide tube or fuel support casting. The close proximity of the guide tube and the core plate hole facilitates the transfer of upward loads from the core plate to the guide tube. The load-bearing wedges restrain the core plate from upward deflection beyond a certain limit and transfer loads from the core plate to the guide tubes. The transfer of loads from the core plate to the guide tubes ensures that, even if extensive cracking of the core plate support structure occurs, an alternate load path is available to limit stresses in the core plate and limit crack propagation in the core plate support structure.

BRIEF DESCRIPTION OF THE DRAWINGS

FIG. 5 is a schematic diagram showing an isometric view of the guide tube gap wedge system of FIG. 4.

FIG. 6 is a schematic diagram showing a sectional view of a latch and latch drive mechanism incorporated in the guide tube gap wedge system of FIGS. 4 and 5.

FIG. 13 is a schematic diagram showing a plan view of adjacent guide tubes and a guide tube gap wedge system in accordance with a third preferred embodiment of the invention, one compression wedge is shown in the extended position (dashed-dotted lines) and in the retracted position (solid lines).

DETAILED DESCRIPTION OF THE PREFERRED EMBODIMENTS

Figure 1:
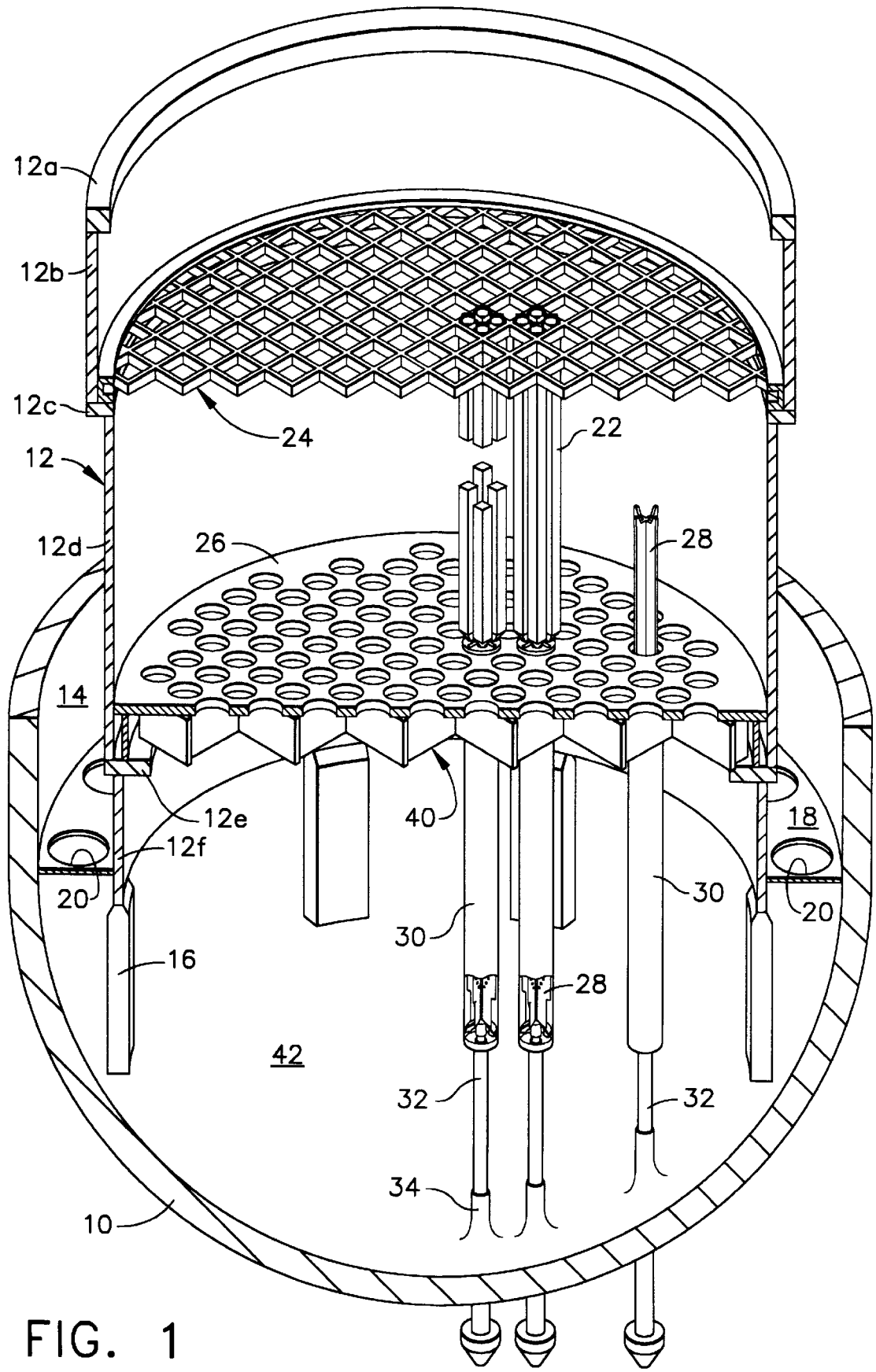
FIG. 1 is a schematic diagram showing an isometric view of portions of a typical BWR having a core plate penetrated by a multiplicity of guide tubes.
Figure 2:
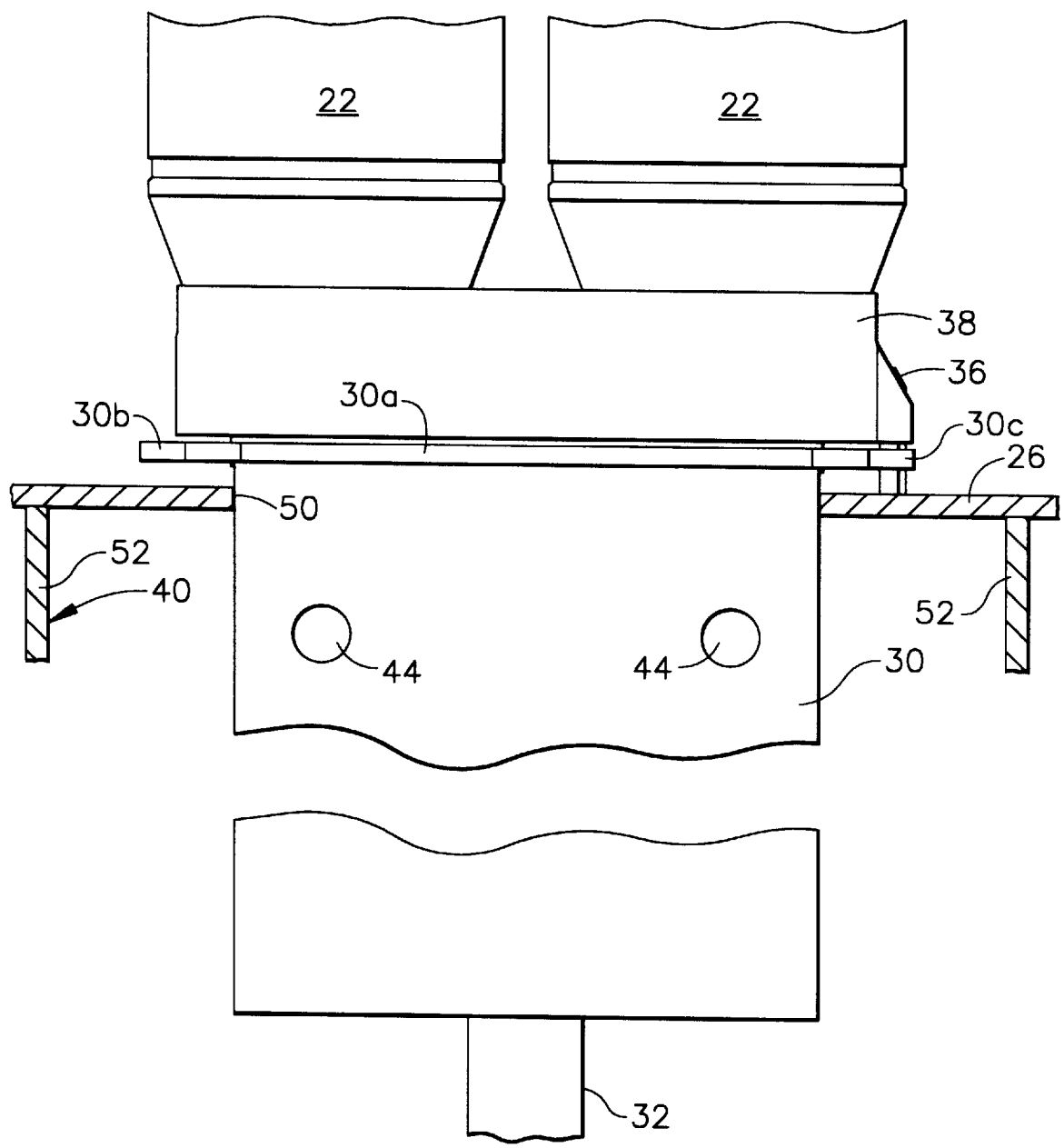
FIG. 2 is a schematic diagram showing a portion of the reactor of FIG. 1 on a magnified scale.

As best seen in FIG. 2, a guide tube 30 passes through a circular aperture 50 in the core plate 26. The guide tube extends vertically downward and is bolted to the top of the control rod drive housing 32. The support structure 40 comprises a lattice of beams 52, only two of which appear in FIG. 2. The beams are welded to the core plate 26 and serve to stiffen the core plate. The stiffened core plate is less susceptible to vertical vibrations during reactor operation and vertically upward displacement of the core plate in response to the pressure exerted on its undersurface by upwardly flowing coolant water in lower plenum 42 (see FIG. 1) is restrained.

Figure 3:
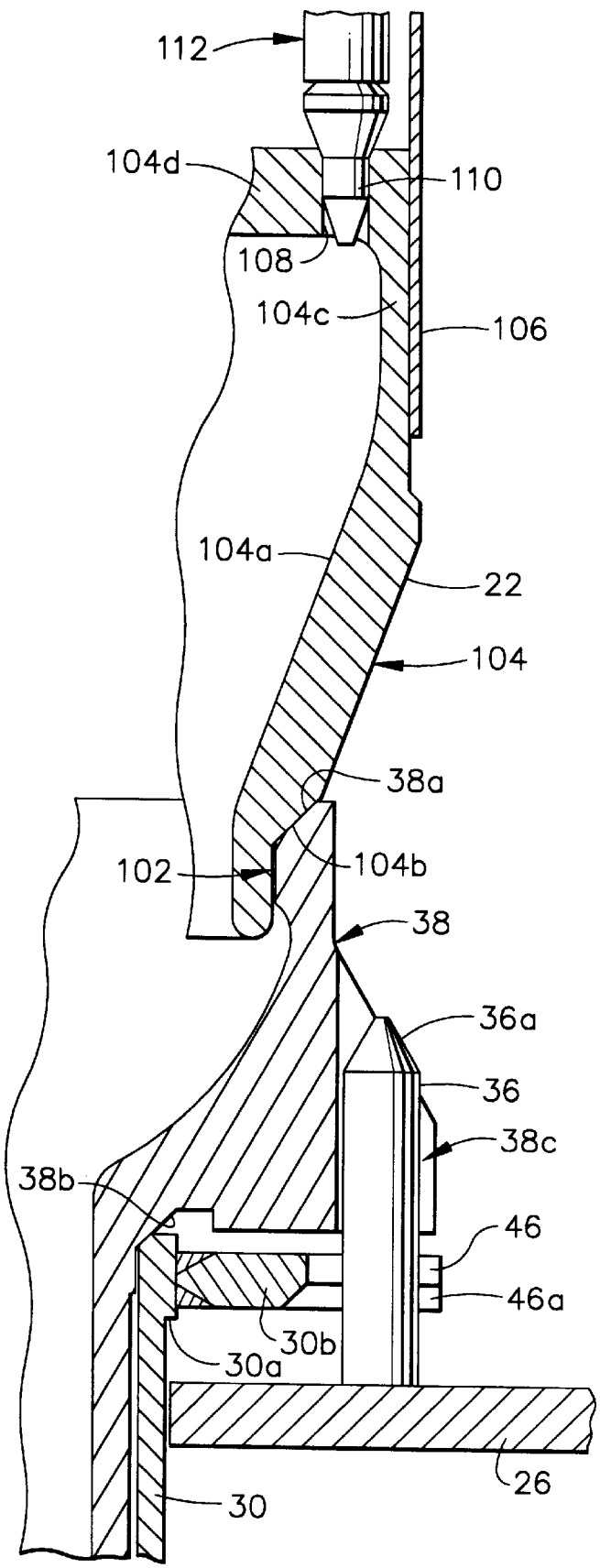
FIG. 3 is a schematic diagram showing a sectional view of the top of the guide tube and components vertically supported thereby in a typical BWR.

In the postulated event of extensive cracking of the support structure, the core plate is not restrained against vertical vibrations and upward displacement in response to the water pressure in the lower head of the reactor pressure vessel. The present invention provides a repair for a core plate having a cracked support structure. In accordance with the preferred embodiments, one or more load-bearing wedge elements are installed in the gap (see FIG. 3) between the machined step 30a of a guide tube 30 and the core plate 26. The machined step 30a extends radially outward a distance equal to about 30 mils. The height of the portion of the wedge element which is interposed between the machined step and the core plate must be less than the height of the gap between the machined step and the core plate, which is typically about ½ inch.

Figure 4:
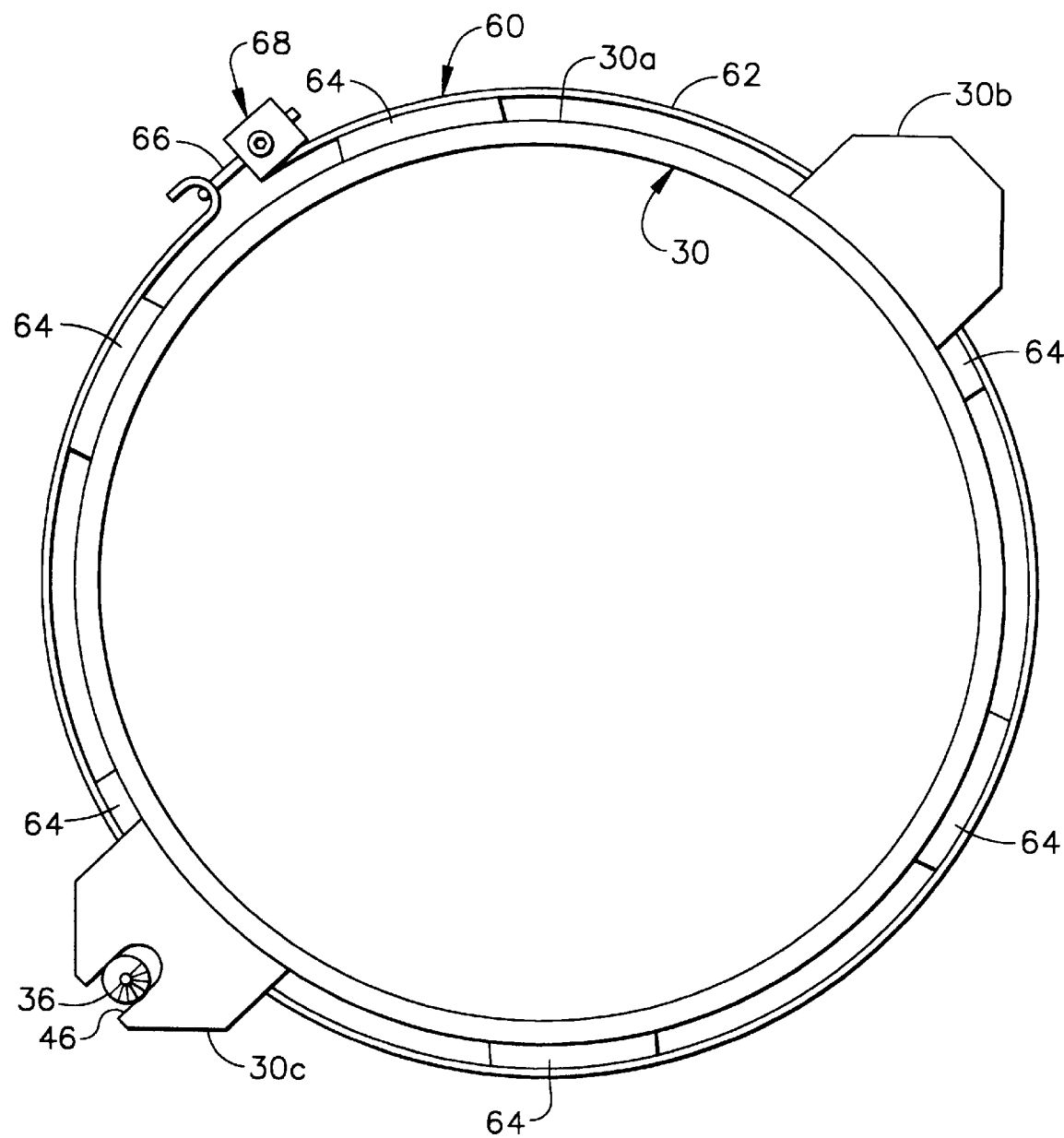
FIG. 4 is a schematic diagram showing a plan view of a guide tube and a guide tube gap wedge system in accordance with one preferred embodiment of the invention.

In accordance with a preferred embodiment shown in FIG. 4, a section of core plate surrounding a guide tube is restrained against upward deflection by installing a belted wedge repair assembly 60 between the core plate 26 and the machined step 30a of a guide tube 30. Each belted wedge repair device comprises a plurality of wedge blocks 64 attached to a flexible tensioning belt 62 at spaced intervals therealong. Tensioning belt 62 is preferably a thin band of a metal alloy having high strength and high resistance to corrosion in the high-temperature, high-radiation reactor environment. One suitable material is XM-19 stainless steel.

Each wedge block 64 fits in the gap which separates the core plate and the guide tube machined step. Each wedge block has planar upper and lower surfaces separated by a constant thickness, i.e., the upper and lower surfaces are parallel. The thickness is less than the height of the gap between the machined step and core plate. The wedge blocks may also be made of XM-19 stainless steel.

The belted wedge repair assembly 60 is placed around the outer periphery of the guide tube at an elevation between the core plate and the guide tube lugs, and then locked in place. As best seen in FIG. 5, the belt 62 has a slotted U-shaped end portion 62a which receives and captures the distal end of a latch 66. The latch 66 is rotatably supported by a latch drive assembly 68 mounted to the other end of belt 62. The latch drive assembly is operated remotely to lock and then tension the latch 66 in the capture device 62a.

Referring to FIG. 6, the latch drive assembly 68 comprises a housing 70 which is securely attached to the belt 62, e.g., by welding or brazing. The ceiling 70a of housing 70 has an aperture in which a bushing 72 is press-fitted. A bearing 76 of a bevel gear 74 is rotatably mounted in the bushing 72. The bearing 76 has a circular cylindrical axial blind bore 78 into which is press-fitted an unthreaded portion 80a of the shaft of a socket head shoulder screw 80. The unthreaded portion 80a is formed by removing the screw threads along a predetermined length of the distal end of the screw shaft. The socket head 80b of shoulder screw 80 receives a mating tool (not shown) mounted on one end of a conventional service pole. The other end of the service pole is manipulated by maintenance personnel standing on the refueling bridge of the reactor. When the mating tool is engaged in the socket head, the pole can be manipulated to cause the shoulder screw 80 and bevel gear 74 to rotate about a vertical axis.

The teeth of bevel gear 74 are meshed with the teeth of a bevel gear 82. The bevel gear 82 has a bearing 84 which is rotatably supported by a bushing 86 press fitted into an aperture in wall 70b of housing 70. The bevel gear 82 rotates about a horizontal axis in response to rotation of the bevel gear 74.

The bevel gear 82 has a threaded circular cylindrical axial bore 88. The threaded surface inside bore 88 engages a threaded surface on a shaft 90 to which latch 66 is connected. In accordance with the preferred embodiment, the distal end of latch 66 is bent to form an extension or hook 66a which is generally transverse to the latch shaft axis. The extension 66a has a profile which allows it to pass through the slot 92 formed in the U-shaped end 62a. After the extension 90a is passed through the slot, the bevel gear 74 is rotated to cause bevel gear 82 and latch 66 to rotate together about a horizontal axis. The latch extension 66a has a sufficient length that it abuts one leg of the U-shaped end 62a at a predetermined angular position. In that predetermined angular position, the extension 66a is no longer aligned with the slot 92 and cannot pass back through, i.e., the belt is latched in its closed configuration surrounding the guide tube.

At the point of abutment, further swinging of the extension 66a is blocked by the leg of U-shaped end 62a. However, the maintenance personnel continue to rotate the bevel gear 74, which in turn causes the bevel gear 82 to continue to rotate. Because latch 66 is blocked from further rotation but still threadably coupled to the rotating bevel gear 82, the latch 66 displaces axially toward the bevel gear 82. As the latch displaces, the latch extension 66a is pulled against the U-shaped end 62a of belt 62 with increasing tension. When the desired level of belt tension is attained, the bevel gear 74 can be locked against rotation in the direction of belt detensioning by any conventional means, e.g., tack welding.

During installation, a remotely operated video camera is used to ensure that the wedge blocks 64 are properly positioned in the gap between the core plate 26 and the machined step 30a of the guide tube 30 before the belt 62 is tensioned. The tensioned belt then holds the wedges in position during reactor operation. When the core plate is deflected upward a sufficient distance, the upper surface of each wedge block will bear against the undersurface of guide tube step 30a, in which event the latter acts as a stop to block further upward deflection of the abutting core plate section. The entire core plate can be restrained against upward deflection by installation of identical wedge block belts around a multiplicity of guide tubes.

Figure 8:
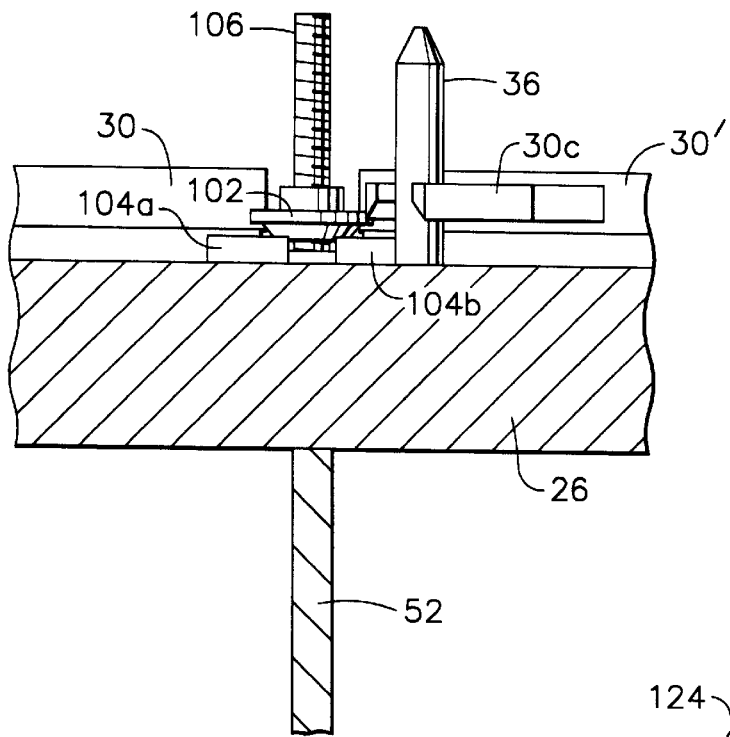
FIG. 8 is a schematic diagram showing an elevation view of the guide tube gap wedge system of FIG. 7.

In accordance with a second preferred embodiment, an expansion wedge repair assembly comprises two subassemblies 100*a* and 100*b* which are held together with a bracket 102 (shown in FIGS. 8–10) in a configuration narrow enough to fit between the guide tubes. As seen in FIG. 8, each subassembly comprises a pair of compression wedges 104*a* and 104*b* which are positioned laterally in the gaps between the core plate and the machined steps 30*a* of guide tubes 30 and 30', respectively.

Figure 9:
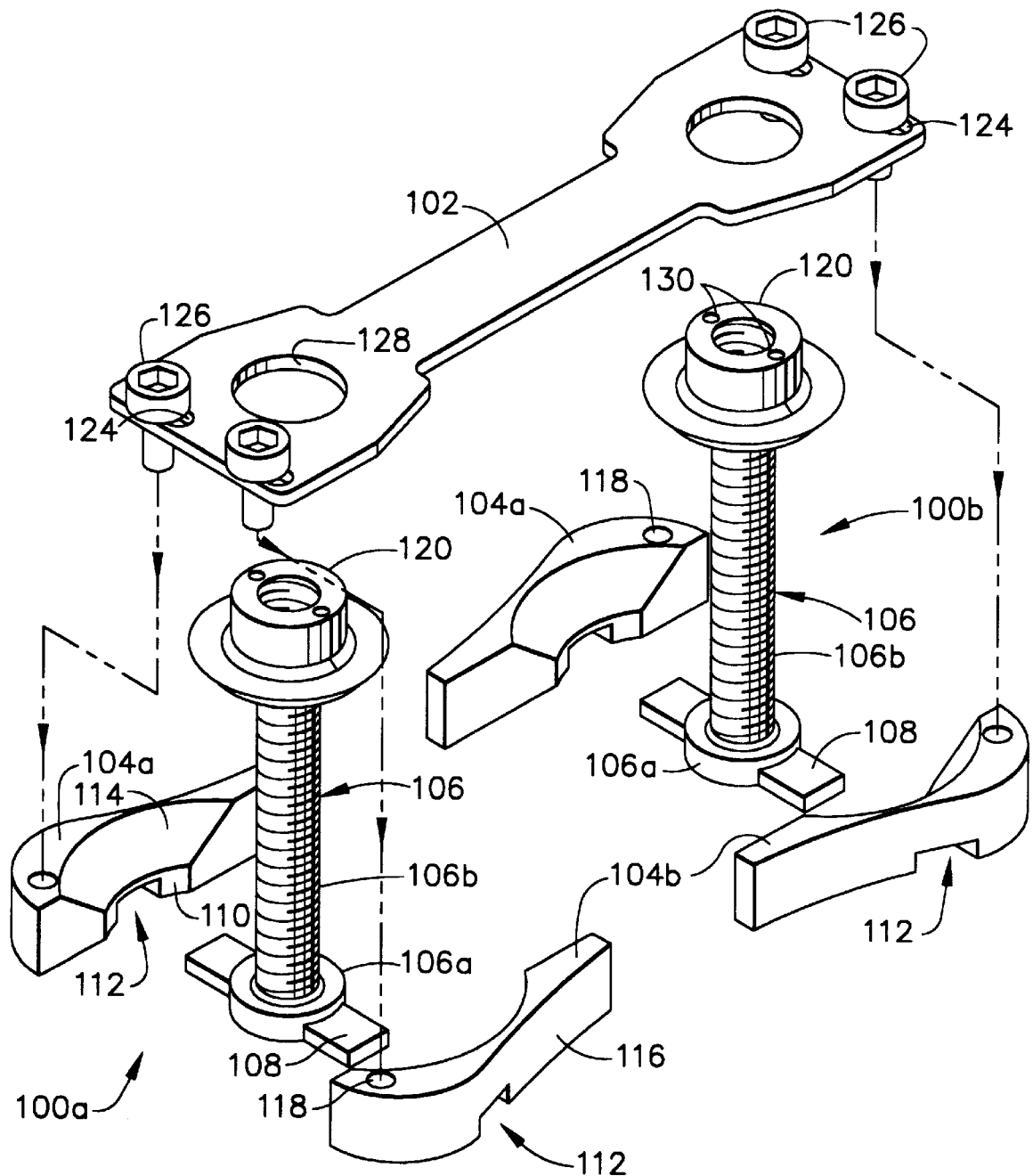
FIG. 9 is a schematic diagram showing an exploded isometric view of the guide tube gap wedge system of FIGS. 7 and 8.

Referring to FIG. 9, each subassembly comprises a support stud 106 having a circular base 106*a* and a circular cylindrical shaft 106*b*. The outer surface of shaft 106*b* is threaded. The bottom of base 106*a* has a diametrally disposed groove in which a linear guide rail 108 is press-fitted or otherwise secured. The groove in base 106*a* has a rectangular cross section. The guide rail 108 is a cylindrical bar of rectangular cross section conforming in shape to the groove in the base. The guide rail 108 extends in opposite directions transverse to the axis of the shaft 106*b* along an axis of displacement of the associated compression wedges.

Figure 10:
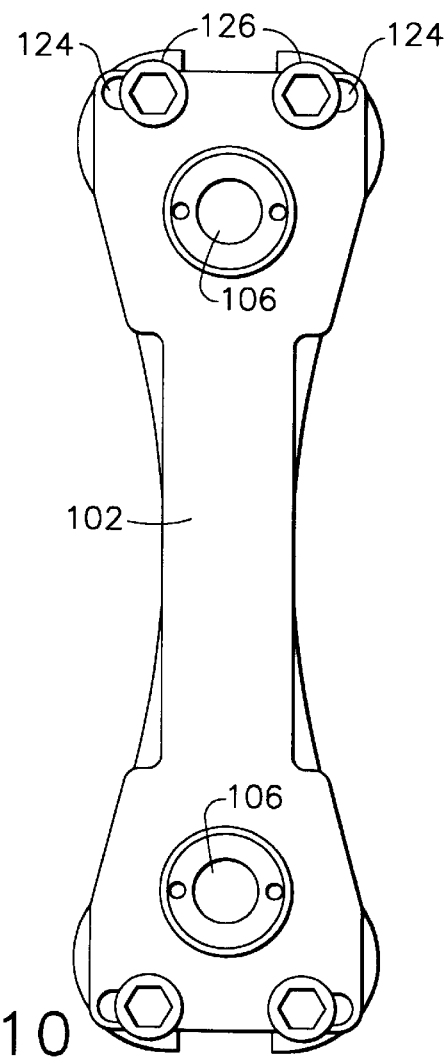
FIG. 10 is a schematic diagram showing a plan view of the guide tube gap wedge system of FIGS. 7–9 with the compression wedges in their retracted positions.
Figure 12:
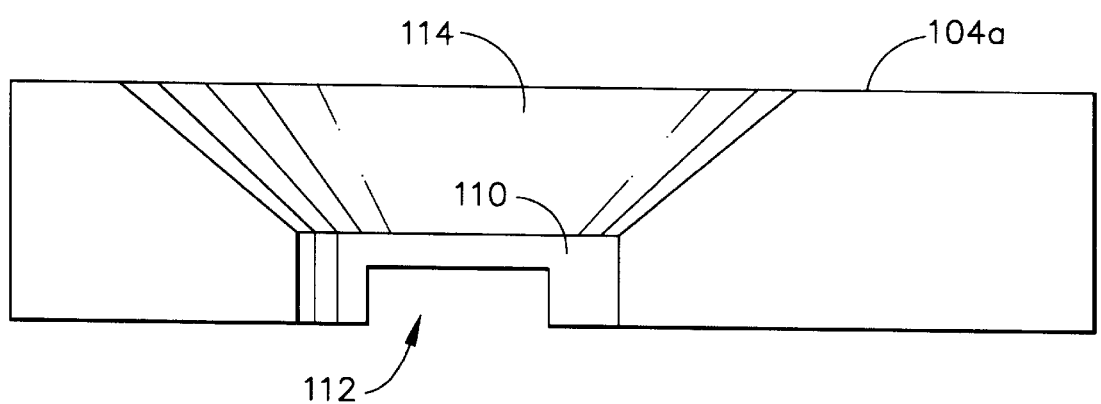

Referring to FIGS. 9 and 12, each compression wedge 104*a*, 104*b* has a plano-concave surface 110 with a radius of curvature slightly greater than the radius of base 106*a*. In respective retracted positions, surfaces 110 of wedges 104*a* and 104*b* encircle the base 106*a* and the entire assembly has a narrow footprint, as seen in FIG. 10. Each wedge also has a groove 112 of rectangular cross section with a centerline generally aligned with a radius of curvature surface 110. The groove 112 has a width slightly greater than the width of the guide rail 108 to allow the compression wedges to slide easily along the rail. Each wedge also has a bearing surface 114 which is contoured to react the force exerted over an area of contact with a downwardly pressing conical expansion wedge 120 into a lateral force component which forces the wedges to slide away from each other along the guide rail 108 and toward extended positions.

In the extended positions, contoured contact surfaces 116 on the wedges are interposed between the core plate and the machined steps of adjacent guide tubes, i.e., the assembly has an expanded footprint which cannot fit between the adjacent machined steps overlying the contact surfaces 116. Preferably each contact surface 116 is a plano-concave surface having a radius of curvature slightly greater than the radius of curvature of the guide tube.

Figure 11:
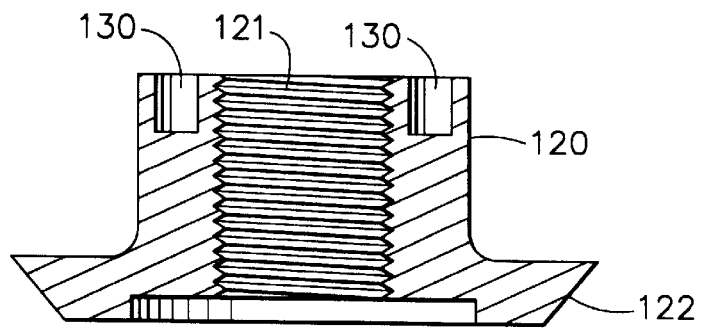
FIGS. 11 and 12 are schematic diagrams showing sectional views of an expansion wedge and a compression wedge incorporated in the guide tube gap wedge system of FIG. 9.

In accordance with the second preferred embodiment, the compression wedges are driven apart and into their extended positions by an expansion wedge 120 which has a bearing surface 122 in the shape of a truncated cone. The angle of the conical bearing surface 122 matches the angle of the bearing surface 114 on the associated compression wedges 104*a* and 104*b*. The expansion wedge 120 has a threaded bore 121 which threadably couples with the threaded shaft 106*b* of the support stud 106. The expansion wedge 120 acts like a nut when rotated in the direction of tightening. The expansion wedge 120 travels axially along the support stud 106 until the conical bearing surface 122 abuts the bearing surfaces 114 of the compression wedges 104*a* and 104*b*. Further rotation of the expansion wedge forces the compression wedges to displace in opposite directions along the guide rail 108. As shown in FIG. 11, the expansion wedge has a pair of unthreaded axial blind bores 130 for receiving respective dowel pins of a remotely operable torquing tool (not shown).

A bracket 102 couples the subassemblies 100*a* and 100*b* to form an assembly which can be lowered into position as a unit. Bracket 102 has two apertures 130 for passage therethrough of the expansion wedges 120 as they spiral downward along the support stud 106 and into contact with the inclined surfaces on the compression wedges. The limits of travel of the compression wedges 104*a* and 104*b* relative to the guide rail 108 are established by respective slots 124 (see FIG. 10) formed in the bracket 102. A respective socket head pin 126 is passed through each slot 124 and press-fit into an unthreaded circular cylindrical blind bore 118 formed in each compression wedge. Although the pin is securely connected to the compression wedge, the pin and wedge are able to slide laterally along the slot until the pin abuts an end of the slot.

Figure 7:
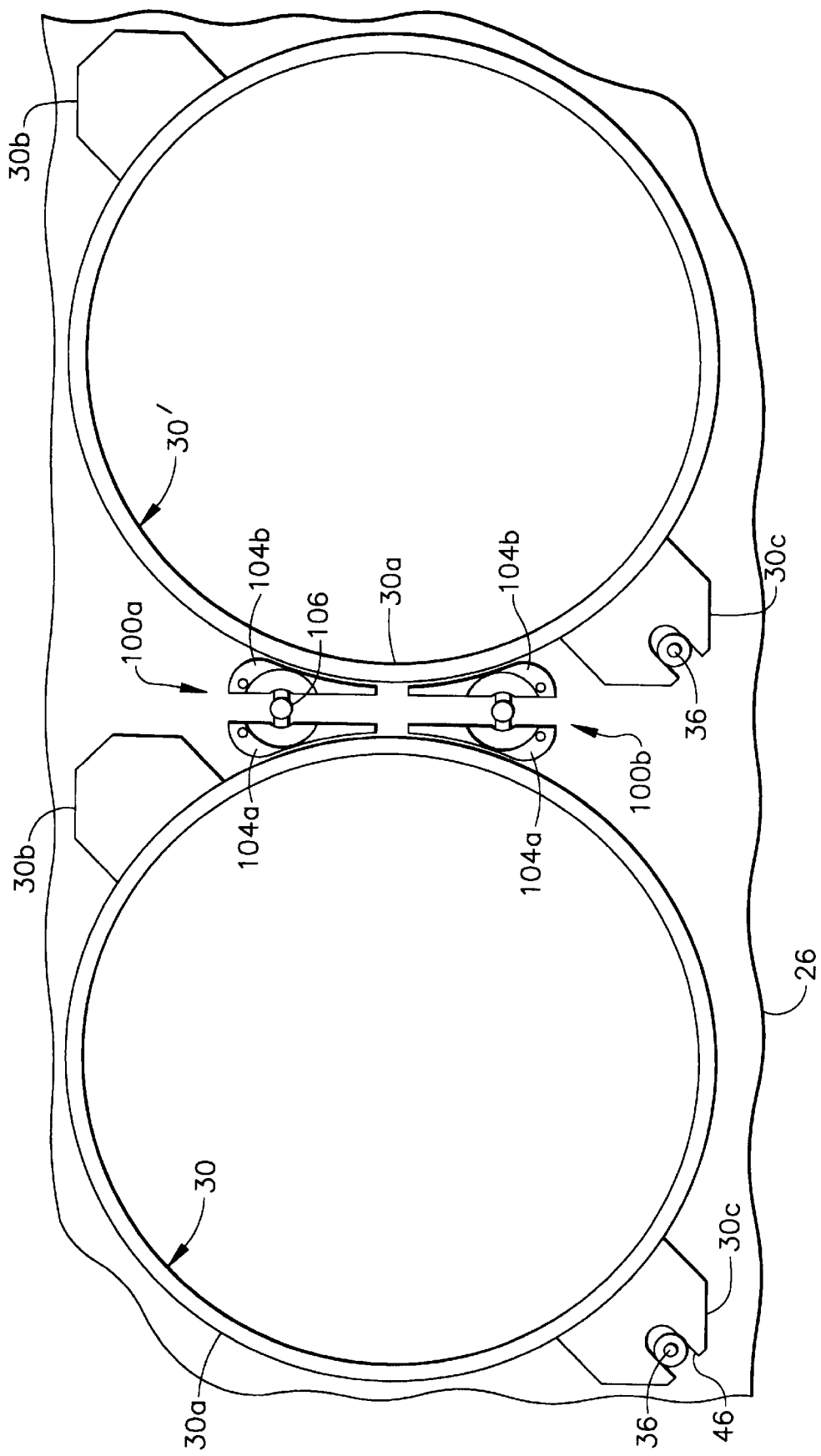
FIG. 7 is a schematic diagram showing a plan view of adjacent guide tubes and a guide tube gap wedge system in accordance with another preferred embodiment of the invention. The expansion wedges and bracket are not shown to better illustrate the positioning of the compression wedges.

During the installation procedure, the expansion wedge repair assembly is lowered to a position on top of the core plate 26 and between a pair of adjacent guide tubes 30 and 30', as shown in FIG. 7. Each expansion wedge 120 receives two dowel pins of a mating tool (not shown) mounted on one end of a conventional service pole. The other end of the service pole is manipulated by maintenance personnel standing on the refueling bridge of the reactor. When the dowel pins of the mating tool are engaged with the bores 130 in an expansion wedge, the pole can be manipulated to cause the expansion wedge to spiral downward along the support stud axis. The mating tool must have a central hole for receiving the support stud as the tool and expansion wedge displace axially downward relative to the support stud. The expansion wedge is torqued until the compression wedges are expanded into abutment with adjacent guide tubes 30 and 30', thereby interposing the compression wedges in the gaps between the core plate and the machined steps of the guide tubes. Up to eight compression wedges can be interposed between the core plate and the guide tube step at spaced intervals around the guide tube periphery, each pair being centered at 90° azimuthal intervals. The compression wedges can be locked in place by any suitable means, e.g., by tack welding the expansion wedge to the support stud.

Referring to FIG. 13, a guide tube gap wedge system in accordance with a third preferred embodiment of the invention comprises an expansion wedge 132 and a pair of curved compression wedges 134 and 136 slidably mounted in opposing curved grooves formed in the expansion wedge 132. Curved compression wedge 134 has an arc-shaped contact surface 134*a*, which bears against the outer circumferential surface of guide tube 30 when both compression wedges are in their retracted positions (indicated by solid lines in FIG. 13), and an arc-shaped projection 134*b*, which fits inside and slides in a first arc-shaped groove formed in the expansion wedge (indicated by dashed curved lines in FIG. 13). Likewise, curved compression wedge 136 has an arc-shaped contact surface 136*a*, which bears against the outer circumferential surface of guide tube 30' when both compression wedges are in their retracted positions, and an arc-shaped projection 136*b* which fits inside and slides in a second arc-shaped groove formed in the expansion wedge. The radius of the arc-shaped contact surfaces 134*a* and 136*a* is substantially equal to the radius of the guide tubes. The radius of the projections 134*b*, 136*b* is equal to or greater than the radius of the guide tube. Each compression wedge is configured so that its width (measured, e.g., along a line perpendicular to the contact surface) decreases monotonically as the compression wedge is traversed in a direction from the wide end to the narrow end of the compression wedge.

The wedge assembly in accordance with the third embodiment is lowered into position with the compression wedges in respective extended positions that allow the entire assembly to fit in between a pair of adjacent guide tubes. The extended position of compression wedge 136 is indicated by dashed-dotted lines in FIG. 13. When the assembly is seated on the core plate, a remotely operated tool (not shown) is then used to move the compression wedges 134, 136 into their retracted positions (indicated by solid lines in FIG. 13) by sliding displacement along the central expansion wedge, until the contact surfaces 134a, 136a of the compression wedges are flush against the opposing outer circumferential surfaces of two adjacent guide tubes 30 and 30'. In the finally installed position, the compression wedges extend underneath the overhang of the machined steps on the guide tubes. The height of each compression wedge is selected so that undesired upward vertical displacement of the core plate relative to the guide tube is blocked by engagement of the compression wedges with the machined step on the guide tube.

In accordance with a further feature of the third preferred embodiment, each compression wedge is locked in the retracted position by means of respective integral spring arms 134c, 136c having ratchet teeth which respectively engage the ratchet teeth on respective mating spring arms 132a and 132b integrally formed on the expansion wedge 132. The ratchet teeth on spring arms 134c, 136c are configured to slide over the ratchet teeth formed on the expansion edge during sliding displacement of the compression wedges from their extended positions to their retracted positions, while providing a positive lock against loosening of the wedge assembly. The ratchet teeth fit may also provide some spring arm residual preload. This will assure the assembly is not loose during operation, avoiding susceptibility to vibration-induced fretting and wear.

Figure 14:
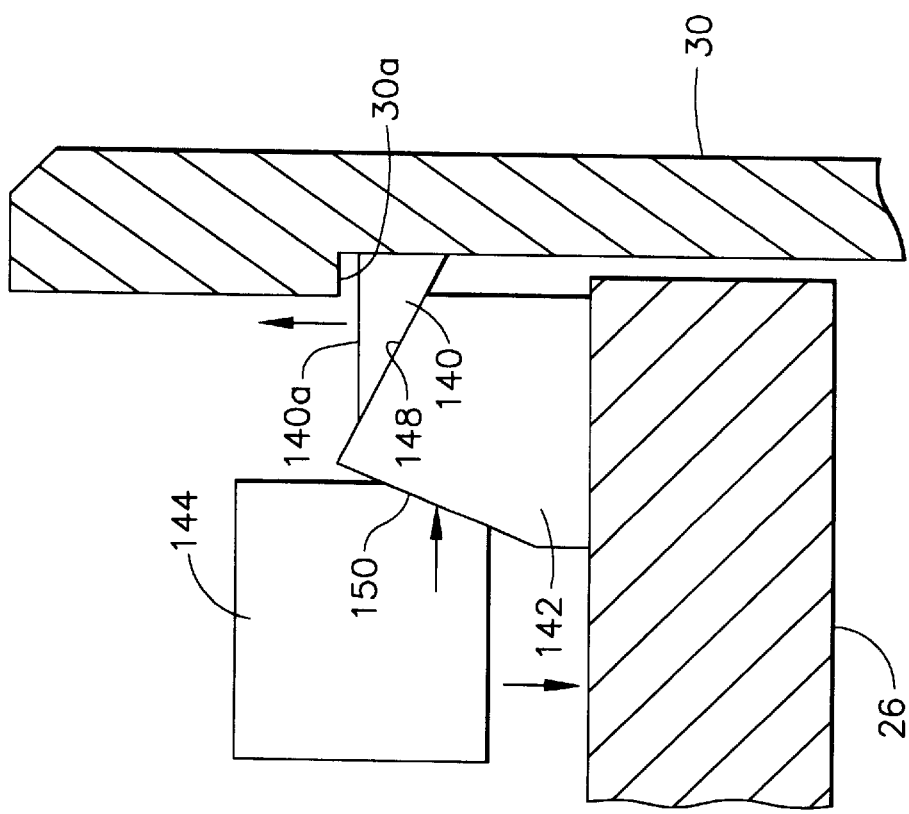
FIG. 14 is a schematic showing a sectional elevation view of a guide tube gap wedge system of the type shown in FIG. 7, but modified to have vertical expansion means.

In accordance with a further enhancement, the preferred embodiments depicted in FIGS. 4 and 7 can be modified to include vertical expansion means mounted on the horizontal expansion means. For example, the embodiment of FIG. 7 can be modified, as seen in FIG. 14, so that each compression wedge 142 has a vertical expansion wedge 140 slidably mounted thereon. The vertical expansion wedge 140 projects in front of the compression wedge 142 as the latter is moved toward contact with the guide tube 30 by the camming action of the horizontal expansion wedge 144 bearing on an inclined camming surface 150 of compression wedge 142. The vertical expansion wedge 140 abuts the outer circumferential surface of the guide tube as the compression continues to displace toward the guide tube and is pushed upward by another inclined camming surface 148 on the compression wedge. The vertical expansion wedge 140 elevates until the upper edge 140a of wedge 140 contacts and is urged against the underside of machined step 30a at the top of the guide tube. The compression applied under the step 30a will be a function of the mechanical preload applied via remote manipulation of the horizontal expansion wedge 144.

Figure 15:
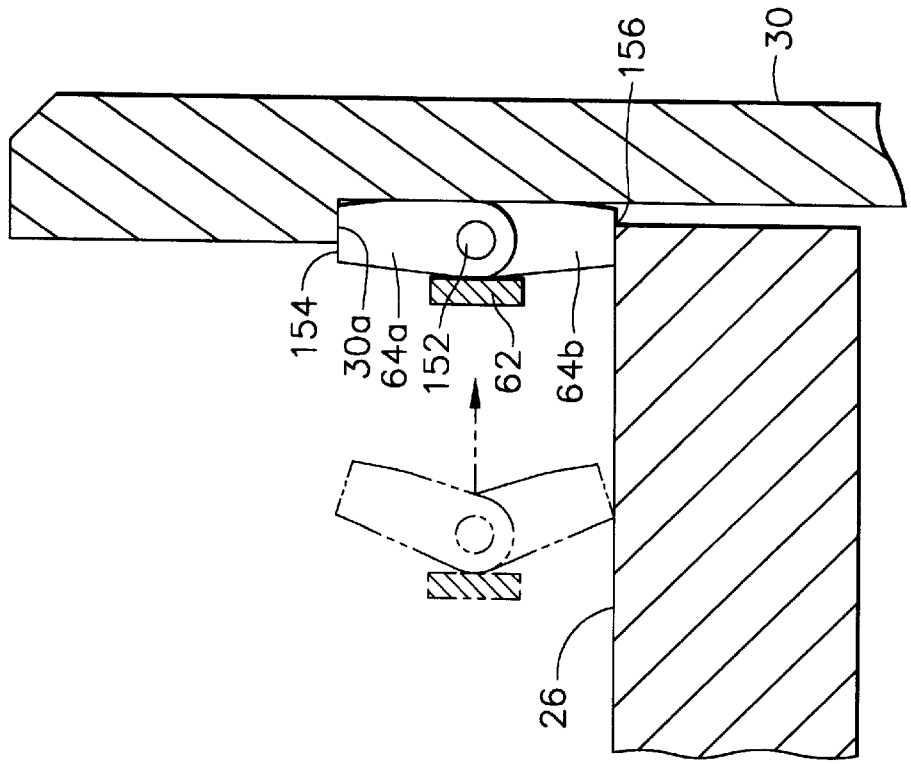
FIG. 15 is a schematic showing a sectional elevation view of a guide tube gap wedge system of the type shown in FIG. 4, but modified to have vertical expansion means.

Similarly, the embodiment of FIG. 4 can be modified to provide vertical expansion means. As seen in FIG. 15, each wedge block carried by tensioning belt 62 is replaced by a pair of wedge blocks 64a, 64b pivotably mounted on a pivot pin 152, which is supported on the belt 62 by conventional means (e.g., brackets) not shown. A plurality of pairs of pivotable wedge blocks are mounted at spaced azimuthal positions on the belt. Prior to belt tensioning, the pivotable wedge blocks of each pair are oriented at a predetermined angle greater than 90° but less than 180° relative to each other, as indicated by dashed lines in FIG. 15. When the belt is tensioned, the tips 154, 156 the pivotable wedge blocks 64a, 64b contact the guide tube 30 and are rotated in opposite directions with increasing belt tension, during which the pivot pin 152 moves closer to the guide tube. The pivotable wedge blocks have lengths such that when the wedge blocks reach a relative angular position of about 180°, the tip 154 of each upper pivotable wedge block 64a will be pressed up underneath the machined step 30a of the guide tube. Each pair of diametrally opposed pivotable wedge blocks acts as a rigid member that restrains upward vertical displacement of the core plate relative to the guide tube.

The preferred embodiments of the present invention have been disclosed for the purpose of illustration. Variations of and modifications to those embodiments will be readily apparent to persons skilled in the pertinent art. All such variations and modifications are intended to be encompassed by the claims appended hereto.

We claim:

1. A method for restraining upward displacement of a core plate of a nuclear reactor, comprising the step of interposing a first wedge block between the core plate and a step of a first guide tube by sliding said first wedge block along an arcuate slide rail having a radius not less than an outer radius of said first guide tube until said first wedge block is in a position to block the core plate from moving closer than a predetermined distance relative to the step of said first guide tube.

2. The method as defined in claim 1, further comprising the step of securing the first wedge block in its interposed position.

3. A method for restraining upward displacement of a core plate of a nuclear reactor, comprising the steps of interposing a first wedge block between the core plate and a step of a first guide tube to block the core plate from moving closer than a predetermined distance relative to the step of said first guide tube, and securing the first wedge block in its interposed position by tightening a flexible band which presses the first wedge block against an outer surface of the first guide tube.

4. A method for restraining upward displacement of a core plate of a nuclear reactor, comprising the steps of interposing a first wedge block between the core plate and a step of a first guide tube to block the core plate from moving closer than a predetermined distance relative to the step of said first guide tube, and securing the first wedge block in its interposed position by applying a force on the first wedge block having a component which urges the first wedge block against the first guide tube, said force being reacted to produce a reaction force on a second guide tube adjacent to said first guide tube.

5. The method as defined in claim 4, further comprising the step of interposing a second wedge block between the core plate and a step of the second guide tube to block the core plate from getting closer than a predetermined distance relative to the step of the second guide tube, wherein the second wedge block is held against the second guide tube by said reaction force.

6. A boiling water reactor comprising:

first and second mutually adjacent, vertically disposed control rod guide tubes, each guide tube having a step at a top end thereof;

a core plate having mutually adjacent first and second apertures penetrated by said first and second guide tubes respectively;

a first wedge block interposed between said core plate and said step of said first guide tube, wherein said first wedge block blocks said core plate from moving closer than a predetermined distance relative to said step of said first guide tube;

a second wedge block interposed between said core plate and said step of said second guide tube, wherein said second wedge block blocks said core plate from moving closer than a predetermined distance relative to said step of said second guide tube; and a third wedge block interposed between said first and second wedge blocks, wherein said first and third wedge blocks abut along a first arcuate line and said second and third wedge blocks abut alone a second arcuate line, each of said first and second arcuate lines having a radius no less than an outer radius of said first and second guide tubes.

7. A boiling water reactor comprising:

first and second mutually adjacent, vertically disposed control rod guide tubes, each guide tube having a step at a top end thereof;

a core plate having mutually adjacent first and second apertures penetrated by said first and second guide tubes respectively;

a first wedge block interposed between said core plate and said step of said first guide tube, wherein said first wedge block blocks said core plate from moving closer than a predetermined distance relative to said step of said first guide tube;

a support member to which said first wedge block is attached; and a tensioning device for pressing said first wedge block against an outer surface of said first guide tube by tensioning said support member.

8. The boiling water reactor as defined in claim 7, wherein said support member comprises a flexible band having first and second ends, and said tensioning device comprises:

a latching mechanism for securing said first and second ends of said flexible band together; and a threaded mechanism for adjusting the tension in said flexible band when said first and second ends are secured together.

9. The boiling water reactor as defined in claim 8, wherein said threaded mechanism comprises:

a support structure attached to said flexible band;

a first bevel gear rotatably mounted to said support structure, said first bevel gear having a multiplicity of gear teeth;

a threaded shaft connected to said latching mechanism and having a threaded outer surface; and a second bevel gear rotatably mounted to said support structure and having a multiplicity of gear teeth and a threaded bore, wherein said gear teeth of said first bevel gear mesh with said gear teeth of said second bevel gear, and said threaded bore of said second bevel gear is threadably coupled to said threaded, outer surface of said threaded shaft.

10. A boiling water reactor comprising:

first and second mutually adjacent, vertically disposed control rod guide tubes, each guide tube having a step at a top end thereof;

a core plate having mutually adjacent first and second apertures penetrated by said first and second guide tubes respectively;

a first wedge block interposed between said core plate and said step of said first guide tube, wherein said first wedge block blocks said core plate from moving closer than a predetermined distance relative to said step of said first guide tube;

a guide assembly for guiding displacement of said first wedge block along a first displacement path; and a threaded device having a rotatable part which bears against and displaces said first wedge block along said first displacement path during rotation of said rotatable part.

11. The boiling water reactor as defined in claim 10, further comprising a second wedge block interposed between said core plate and said step of said second guide tube, wherein said guide assembly guides displacement of said second wedge block along a second displacement path, and said rotatable part bears against and displaces said second wedge block along said second displacement path during rotation of said rotatable part.

12. The boiling water reactor as defined in claim 11, wherein said rotatable part of said threaded device has a surface which is a truncated cone and each of said first and second wedge blocks has an inclined surface displacement of said first and second wedge blocks being caused by forces produced by said truncated conical surface bearing against said inclined surfaces of said first and second wedge blocks.

13. An apparatus for restraining upward vertical displacement of a portion of a reactor core plate bounding an aperture relative to a control rod guide tube penetrating the aperture and having a step at an elevation above the core plate, comprising:

vertically expandable wedge means having an overall height which can be varied over a height range having a lower limit and an upper limit, the height above the core plate of a bottom edge of the guide tube step lying within said height range of said vertically expandable wedge means; and means for horizontally displacing a first portion of said vertically expandable wedge means toward the guide tube from a first position whereat a second portion of said vertically expandable wedge means does not contact the guide tube to a second position whereat said second portion of said vertically expandable wedge means contacts the guide tube, wherein said vertically expandable wedge means expands to an overall height equal to the height above the core plate of the bottom edge of the guide tube step as said horizontally displacing means displaces said first portion of said vertically expandable wedge means toward the guide tube from said second position to a third position, said third position being closer to the guide tube than is the second position.

14. The apparatus as defined in claim 13, wherein said first portion of said vertically expandable wedge means comprises a first wedge block having a first inclined camming surface and said second portion of said vertically expandable wedge means comprises a second wedge block having a second inclined camming surface, said first and second camming surfaces being parallel and in contact.

15. The apparatus as defined in claim 13, wherein said first portion of said vertically expandable wedge means comprises a pivot pin and said second portion of said vertically expandable wedge means comprises a wedge block pivotably mounted on said pivot pin.

* * * * *